United States Patent
Silver

(10) Patent No.: US 7,085,065 B2
(45) Date of Patent: Aug. 1, 2006

(54) VARIABLE FOCUS OPTICAL APPARATUS

(76) Inventor: Joshua D. Silver, 19 Cumnor Rise Road, Oxford (GB) OX2 9HD ( * ) Notice: Subject to any disclaimer, the term of this patent is extended or adjusted under 35 U.S.C. 154(b) by 0 days.

(21) Appl. No.: 10/250,866

(22) PCT Filed: Jan. 2, 2002

(86) PCT No.: PCT/GB02/00022

§ 371 (c)(1),
(2), (4) Date: May 20, 2004

(87) PCT Pub. No.: WO02/063353

PCT Pub. Date: Aug. 15, 2002

(65) Prior Publication Data

US 2004/0240076 A1 Dec. 2, 2004

(30) Foreign Application Priority Data

Jan. 2, 2001 (GB) .................................. 0100031.4

(51) Int. Cl.
*G02B 1/06* (2006.01)
*G02B 3/12* (2006.01)

(52) U.S. Cl. ...................................... 359/666; 359/665
(58) Field of Classification Search ................ 359/665, 359/666

See application file for complete search history.

(56) References Cited

U.S. PATENT DOCUMENTS

| 504,890 | A | | 9/1893 | Ohmart | 359/669 |
| 2,836,101 | A | * | 5/1958 | De Swart | 359/666 |
| 4,834,512 | A | | 5/1989 | Austin | 345/6 |
| 5,668,620 | A | | 9/1997 | Kurtin et al. | 351/158 |
| 5,684,637 | A | * | 11/1997 | Floyd | 359/666 |
| 5,973,852 | A | * | 10/1999 | Task | 359/666 |

FOREIGN PATENT DOCUMENTS

| DE | 42 17 853 A1 | 12/1993 |
| WO | WO 98/11458 | 3/1998 |
| WO | WO 99/47948 | 9/1999 |
| WO | WO 01/75510 | 10/2001 |

* cited by examiner

*Primary Examiner*—David N. Spector
(74) *Attorney, Agent, or Firm*—Marshall, Gerstein & Borun LLP

(57) ABSTRACT

A variable focus lens apparatus for use in spectacles or the like is formed from a fluid envelope comprising two sheets, at least one of which is flexible. The flexible sheet is retained in place between two rings, which are directly secured together. This may be by means of adhesive, ultrasonic welding, or any similar process. If the other sheet is rigid, then it may be directly secured to one of the rings.

10 Claims, 2 Drawing Sheets

VARIABLE FOCUS OPTICAL APPARATUS

This is the U.S. national phase of International Application No. PCT/GB02/00022 filed Jan. 2, 2002, the entire disclosure of which is incorporated herein by reference.

The present invention relates to a variable focus optical apparatus, and more particularly to a variable focus lens suitable for use in spectacles or the like.

Variable focus lenses are known per se, and can take the form of a volume of fluid enclosed flexible transparent sheets. Normally, there are two such sheets, one forming the front surface of the lens and one forming the back surface. Both sheets can be flexible, or one can be flexible and one rigid. The sheets are attached to one another at their edges, either directly or to a carrier between the sheets, to form a sealed chamber containing the fluid. Fluid can be introduced into or removed from the chamber to vary its volume. As the volume of liquid changes, so the curvature of the sheet(s), and thus the power of the lens, also varies.

Previous variable focus lenses have generally been too heavy and bulky for use in spectacles or similar apparatus. A light and compact variable focus lens is disclosed in WO 98/11458, in which two flexible membranes are tensioned across a first ring, and held in place by engagement of the first ring with two other rings. However, the construction of the lens in WO 98/11458 requires that the rings be made from a material which is lightweight, strong and ductile, and this can in practice limit the range of materials which can be used.

According to the present invention, there is provided a variable focus optical apparatus, comprising a cavity containing a variable amount of transparent fluid defined between two transparent sheets, at least one of said sheets being a flexible membrane which is held in tension between two interengaging rings, wherein the rings are directly secured to each other.

Because the rings are directly secured to each other, there is no need for them to be formed from a ductile material. Thus, a larger range of materials can be used, which can prove beneficial in terms of cost and weight.

The rings can be secured in any suitable manner. For example, if the rings are formed of a plastics material, ultrasonic welding can be used. However, it is preferred that the rings are secured to each other by means of adhesive, as this method is of more general suitability.

Preferably, the cavity is defined between one flexible membrane and one rigid sheet, and it is preferred for the rigid sheet to be directly secured to is at least one of the rings. This simplifies the structure of the lens. It is further preferred for the rigid sheet and the rings to be secured together by a single application of adhesive, as this makes the construction of the lens easier.

In an alternative embodiment, the rigid sheet is secured to one side of one of the rings, and the other ring is secured to the other side of the ring. This can be useful if the materials of the rings and the rigid sheet are such that they cannot be secured to each other in a single step (for example, because there is no single adhesive which is compatible with all of the materials used).

Preferred embodiments of the invention will now be described by way of example only, and with reference to the accompanying drawings, in which:

FIG. 1 is a schematic cross-sectional view of a part of a known variable focus lens for use in spectacles or the like;

Figure 1:
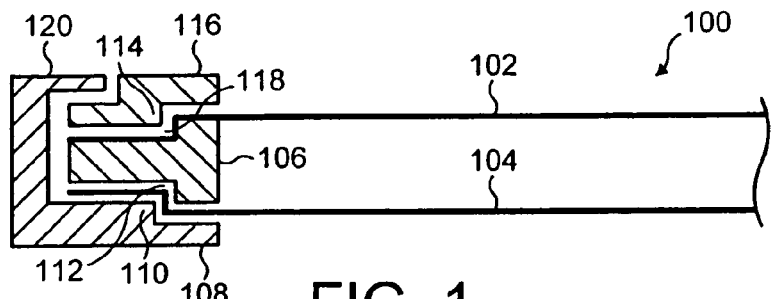

As can be seen from FIG. 1, the known lens 100 comprises two flexible membranes 102, 104, which are attached to either side of a first ring 106. The first ring 106, with the membranes 102, 104 attached, is positioned inside a second ring 108. A step 110 on the second ring 108 engages with a recess 112 on the first ring 106 to hold the lower membrane 104 taut. Similarly, a step 114 on a third ring 116 is engaged with a second recess 118 on the first ring 106 to hold the upper membrane 102 taut. The edge 120 of the second ring 108 is then bent over the edge of the third ring 116 to hold the rings together as a unit. After the rings have been assembled, a hole can be drilled through them to allow fluid to be introduced into or removed from the space between the membranes 102, 104, in order to vary the focus of the lens.

As the lens 100 is to be used in spectacles or similar vision correction apparatus, it will be appreciated that it should be made as light as possible. However, the method of manufacture of the lens requires that at least the second ring be ductile. Further, as the physical strength of the lens is derived from that of the rings, these must be strong enough to enable the lens to withstand the kind of accidental damage to which spectacles and the like are prone. Few materials have the required characteristics of lightness, ductility and strength, and in practice aluminum or titanium are normally used.

Figure 2:
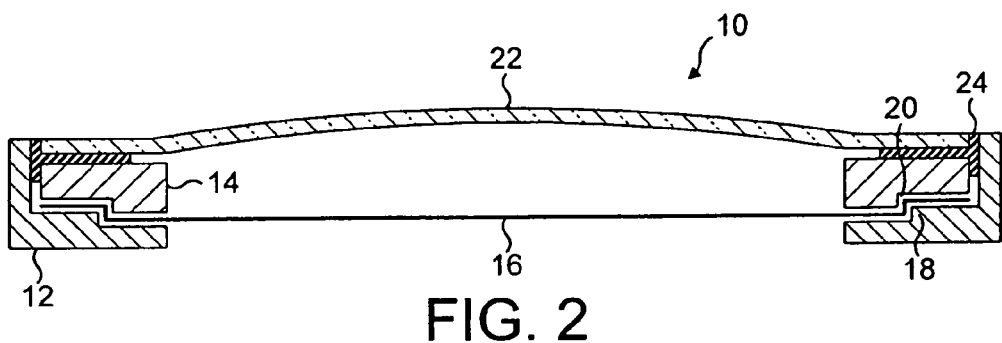
FIG. 2 is a schematic cross-sectional view of a first embodiment of the apparatus.

FIG. 2 shows a cross-section of a first preferred embodiment of the optical apparatus, in the form of a variable focus lens.

The lens 10 comprises first and second rings 12, 14, with the second ring 14 fitting inside the first ring 12. A flexible membrane 16 is retained between the first and second rings 12, 14, and a step 18 on the first ring 12 engages with a recess 20 on the second ring 14 to ensure that the membrane is retained under tension.

However, in contrast to the known lens described above, a rigid sheet 22 is used in place of the second flexible membrane. Further, instead of being retained between two rings, the sheet 22 is directly secured to the rings 12, 14 by means of an adhesive 24. This adhesive also serves to secure the first and second rings together, thus ensuring the integrity of the lens.

The construction of the lens is as follows:

Firstly, the flexible membrane 16 is positioned inside the first ring 12. The second ring 14 is then placed inside the first ring 12 to engage therewith. Before the step 18 on the first ring 12 enters the recess 20 on the second ring 14, it contacts the flexible membrane 16, and frictionally engages with it. Then, as the step 18 enters into the recess 20, it stretches the membrane 16, putting it under tension. When the step 18 is fully received in the recess 20, the membrane 16 is held under tension. The relative heights of the first and second rings are such that the first ring 12 projects slightly above the second ring 14 when the two are engaged.

Adhesive 24 is then applied to the upper surface of the second ring 14, and the rigid sheet 22 is pressed onto the adhesive 24. The thickness of the edge of the rigid sheet 22 is preferably slightly less than the distance by which the first ring projects above the second, so that it fits into the first ring. However, the thickness can be such that it projects slightly, if desired. As the sheet 22 is pressed on, some of the adhesive 24 is forced sideways to come into contact with the first ring 12. Pressure is maintained until the adhesive has set, to secure the first and second rings 12, 14 and the rigid sheet 22 together as a unit.

A hole is then drilled through the rings to allow the cavity between the flexible membrane and the rigid sheet to filled with transparent fluid. Fluid can be introduced into or removed from the lens through this hole, to enable it to function as a variable focus lens.

Using this method of construction removes the need for any of the rings to be ductile, although strength and lightness are still factors. Therefore, the range of materials which can be used is larger. In particular, certain plastics materials can be used.

The rigid sheet 22 is preferably formed from a plastics material, such as polycarbonate. It is of course important to ensure that the materials used to form the rings 12, 14 and the rigid sheet 22 are compatible, and can be adhered together with an adhesive. As shown in the Figures, the sheet 22 can be curved, but does not necessarily have any appreciable optical power.

The flexible membrane 16 is preferably formed from Mylar, although other flexible materials can be used. It has proved extremely difficult to adhere Mylar to other materials using adhesive, and so the flexible membrane is retained between the first and second rings, which are adhered to each other, rather than being adhered directly to the rings.

Means other than adhesive can be used to secure the rings together. For example, the rings and the rigid sheet can be subjected to ultrasonic welding.

Figure 3:
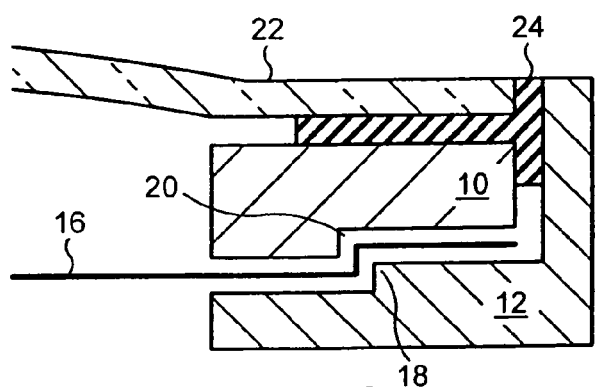
FIG. 3 is an enlarged cross-sectional view of the edge of the apparatus.
Figure 4:
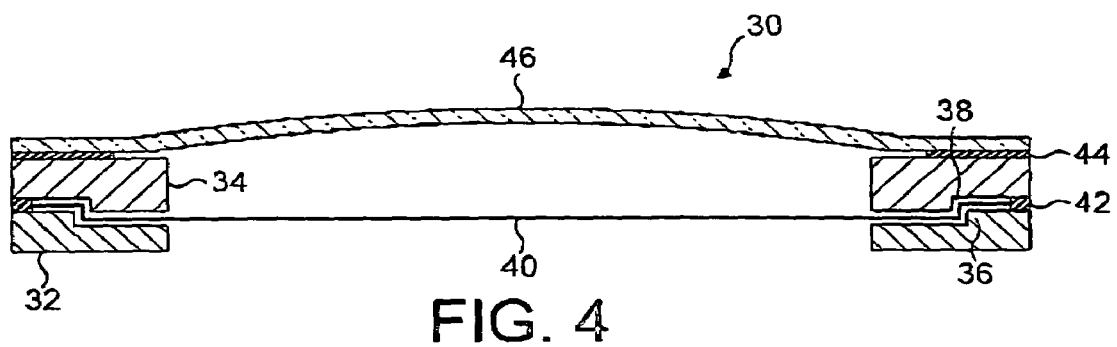
FIG. 4 is a schematic cross-sectional view of a second embodiment of the apparatus.

In the embodiment shown in FIGS. 2 and 3, the second ring 14 and the rigid sheet 22 fit inside the first ring 12, and a single adhesion step is sufficient to hold the lens 10 together. In contrast, in the lens 30 of the second embodiment (as shown in FIGS. 4 and 5), the second ring and the rigid sheet are secured separately to the first ring.

Figure 5:
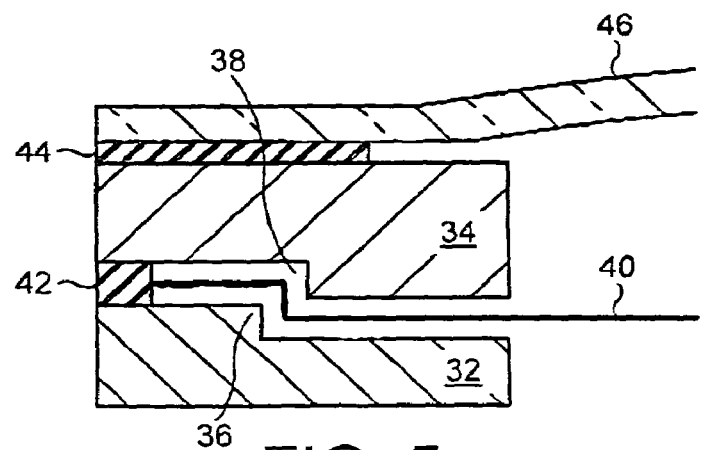
FIG. 5 is an enlarged cross-sectional view of the edge of the apparatus.

As can be best seen from FIG. 5, the first ring 32 has a step 36 and the second ring 34 has a recess 38, and the step 36 engages in the recess 38 to maintain the flexible membrane 40 under tension, as in the first embodiment. Adhesive 42 is applied to at least one of the first and second rings 32, 34 before they are engaged, and the rings are held together under pressure until the adhesive has set. Adhesive 44 is also applied to one of the first ring 32 and the rigid sheet 46, and these are also held together under pressure until the adhesive 44 has set.

The assembly of the lens can be carried in two separate adhering-and-pressing steps, one for the second ring 34 and one for the rigid sheet 46. Alternatively, the adhesive can be applied to both sides of the first ring 32, and the second ring 34 and the rigid sheet 46 assembled onto the first ring 32 and pressed in a single step. One or more hollows may be provided on the confronting surfaces of the first and second rings and the first ring and the rigid sheet, to accommodate excess adhesive.

Once the lens is assembled, a hole is drilled through it to allow the cavity between the flexible membrane and the rigid sheet to be filled with transparent fluid, as in the first embodiment.

It will be appreciated that, in reality, there are no gaps between the various parts of the lens through which fluid could leak. In the Figures, gaps are shown between the various parts solely to show the construction of the lens more clearly.

Further, although various parts of the lenses have been referred to as "rings", it will be appreciated that they can take the shape of any closed curve, and are not necessarily circular. If desired, the rigid sheet can have some cylindrical lens power, to compensate for astigmatic errors which can be introduced in non-circular lenses.

The invention claimed is:

1. A variable focus optical apparatus, comprising a cavity containing a variable amount of transparent fluid defined between two transparent sheets, at least one of said sheets being a flexible membrane which is held in tension between two interengaging rings, wherein the rings are directly secured to each other.

2. Apparatus as claimed in claim 1, wherein said rings are secured to each other by means of adhesive.

3. Apparatus as claimed in claim 1, wherein the cavity is defined between one flexible membrane and one rigid sheet.

4. Apparatus as claimed in claim 3, wherein said rigid sheet is directly secured to at least one of said rings.

5. Apparatus as claimed in claim 4, wherein said rigid sheet and said rings are secured together by a single application of adhesive.

6. Apparatus as claimed in claim 4, wherein said rigid sheet is secured to one side of one of said rings, and the other said ring is secured to the other side of said one of said rings.

7. Apparatus as claimed in claim 2, wherein the cavity is defined between one flexible membrane and one rigid sheet.

8. Apparatus as claimed in claim 7, wherein said rigid sheet is directly secured to at least one of said rings.

9. Apparatus as claimed in claim 8, wherein said rigid sheet and said rings are secured together by a single application of adhesive.

10. Apparatus as claimed in claim 8, wherein said rigid sheet is secured to one side of one of said rings, and the other said ring is secured to the other side of said one of said rings.

* * * * *